E. GRINDEL
MOTOR CAR.
APPLICATION FILED MAY 24, 1912.

1,091,745.

Patented Mar. 31, 1914.

2 SHEETS—SHEET 1.

WITNESSES:
Adolph Grimm
J. Ellis Glen

INVENTOR:
ERICH GRINDEL,
BY
HIS ATTORNEY.

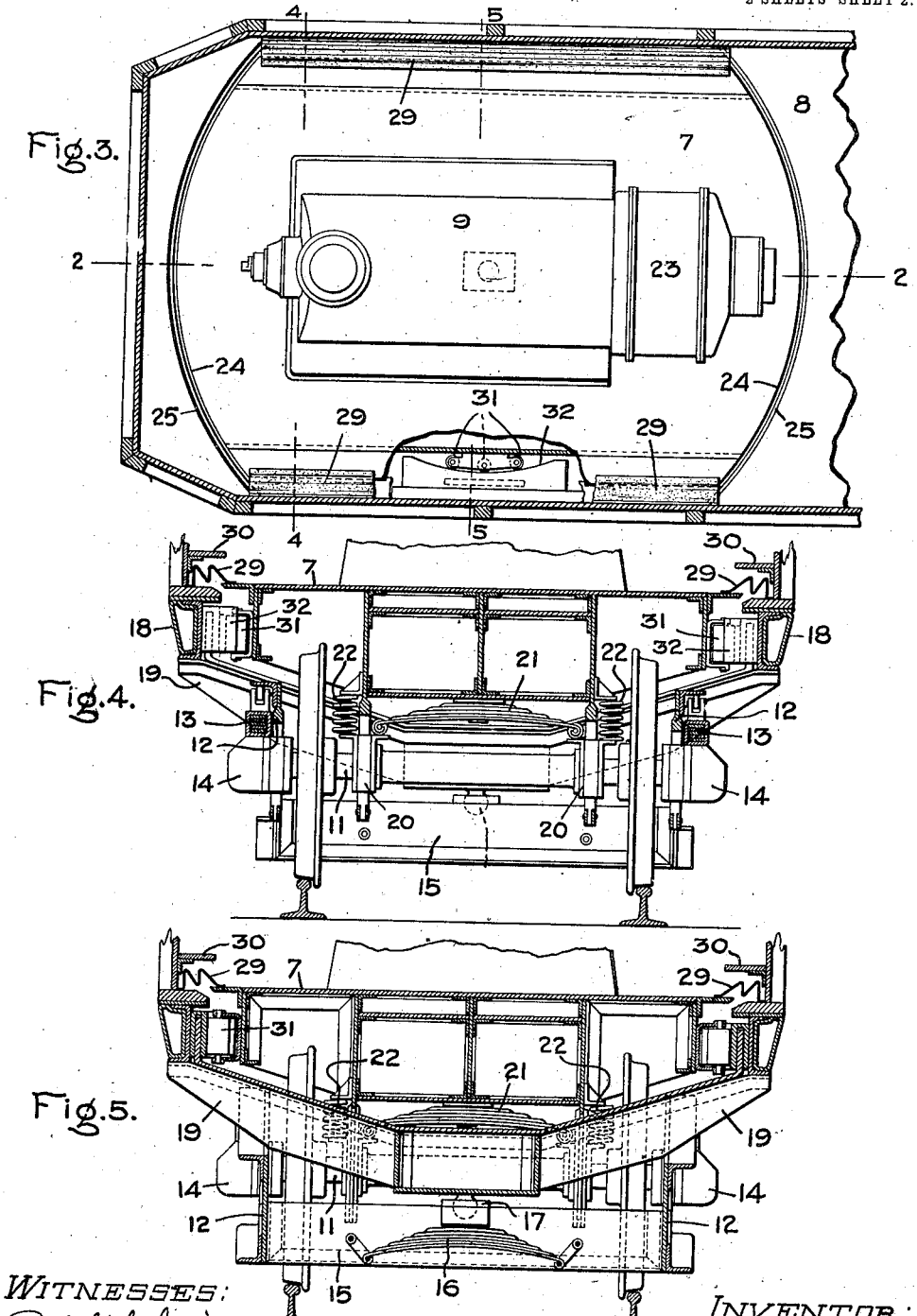

UNITED STATES PATENT OFFICE.

ERICH GRINDEL, OF BREMEN, GERMANY, ASSIGNOR TO GENERAL ELECTRIC COMPANY, A CORPORATION OF NEW YORK.

MOTOR-CAR.

1,091,745.      Specification of Letters Patent.      Patented Mar. 31, 1914.

Application filed May 24, 1912. Serial No. 699,584.

*To all whom it may concern:*

Be it known that I, ERICH GRINDEL, a subject of the Emperor of Germany, residing at Bremen, Germany, have invented certain new and useful Improvements in Motor-Cars, of which the following is a specification.

My invention relates to motor cars, and particularly to such cars in which an engine or the like, is used for developing the power for driving them.

When engines, such as gasolene engines, are used for developing the power for driving a motor car, they are usually placed within the car, because such engines are so large that they cannot be placed under the car and because they require more or less attendance which could not be given to them if they were not within the car. Such engines drive the car axles, either through mechanical gearing or by driving a generator which supplies power to motors connected to the car axles.

My invention has for its object a new and novel supporting means for the engine of a motor car, whereby the vibrations of the engine are not transmitted to the main portion of the car platform, which is usually provided with seats for passengers or with a baggage compartment.

The various features of novelty which characterize my invention are pointed out with particularity in the claims annexed to and forming a part of this specification. For a better understanding of my invention, however, reference may be had to the following description taken in connection with the accompanying drawings, in which—

Figure 1:
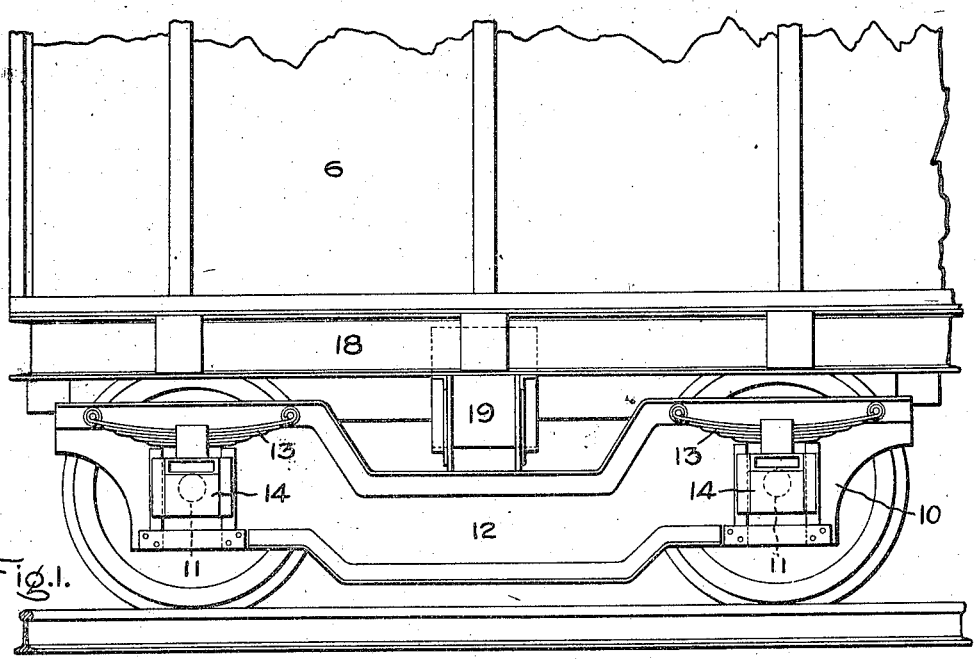
Figure 2:
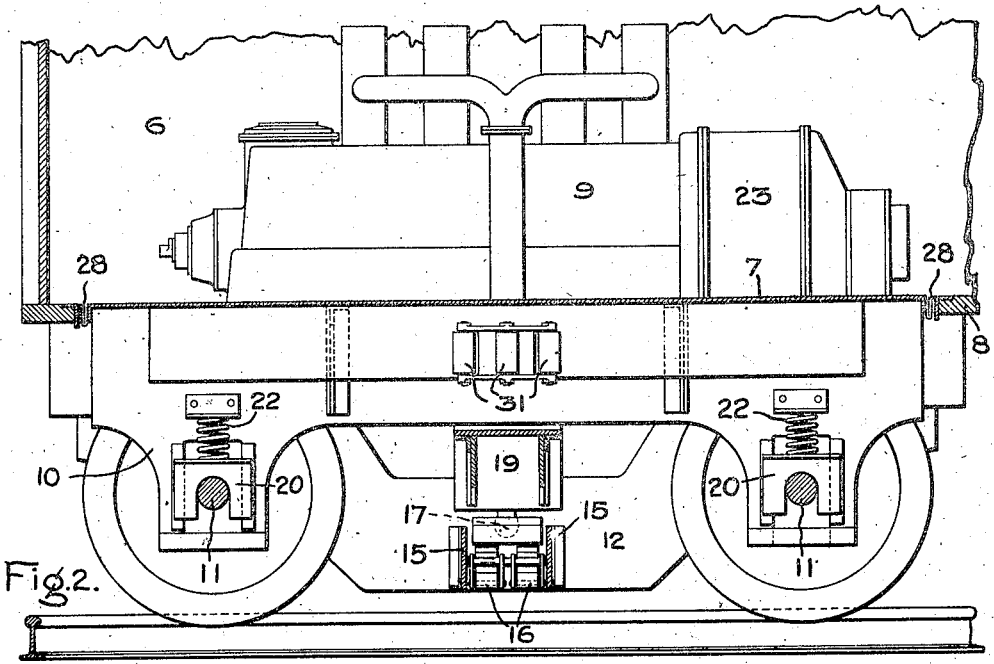

Figure 1 is a side elevation of a portion of a motor car embodying my invention; Fig. 2 is a section on the line 2 2 of Fig. 3; Fig. 3 is a plan view of the car platform of the motor car of Fig. 1, with parts broken away; Fig. 4 is a section on the line 4 4 of Fig. 3; and Fig. 5 is a section on the line 5 5 of Fig. 3.

Referring to the drawings, 6 is a motor car constructed in accordance with my invention in which the car platform is divided into two portions 7 and 8, the upper surfaces of which may be substantially in the same plane. The portion 7 of the car platform has mounted thereon the engine 9, which develops power for driving the car. This portion 7 of the car platform is supported so that the vibrations of the engine 9 are not transmitted to the main portion 8 of the car platform. The main portion 8 of the car platform is that portion which is provided with seats for passengers or on which baggage or the like is carried, and is pivotally mounted on the car trucks 10, only one of which is illustrated. I preferably provide an elastic or spring support for the portion 7, of the car platform, which support is separate from the support of the main portion 8 of the car platform, and in the particular form shown in the drawings, this support is on the car axles 11 and independent of the car truck 10.

The car truck 10 has side frames 12 which are elastically supported by means of springs 13 on journal boxes 14 for the car axles 11 in the well-known manner. The car truck has transoms 15 connecting the side frames 12. These transoms support a spring 16 which in turn supports the joint 17, which I have illustrated as a ball and socket joint. The main portion 8 of the car platform rests on side members 18 which are connected together by cross members 19, only one of which is shown. The ball portion of the joint 17 is fastened to the cross member 19 shown, whereby the main portion 8 of the car platform is pivotally mounted on the car truck 10.

The portion 7 of the car platform, on which the engine 9 is mounted, is elastically supported on members 20 by means of leaf springs 21 and coil springs 22. The members 20 move in suitable guideways and bear on the car axles 11.

The engine 9 is shown as driving an electrical generator 23 which supplies power to motors (not shown) which drive the car axles 11. The engine is located in the interior of the car proper as explained above and is accessible from all sides.

Since the portion 7 of the car platform is mounted on the car axles, it moves with them, and consequently follows the curves in the track with the truck 10, but as the main portion 8 of the platform is pivoted on the car truck 10, the two portions of the car platform rotate relatively to one another when the car is moving around a curve. The edges 24 and 25 of the portions 7 and 8 of the car platform which lie transversely to the direction of travel of the car, are circular in shape, the center of the circle being the joint 17. The lateral edges of the portion 7 are arranged at such a distance from the corresponding edges of the main portion 8 of the car platform so as to permit the necessary motion between the portions 7 and 8. The gaps between the edges 24 and 25 are packed with labyrinth packings 28, and the gaps between the lateral edges of the two portions of the car platform are covered with a diaphragm 29 of leather or the like. Steps 30 protect the diaphragm 29. Rollers 31 are carried by the framework which supports that portion of the car platform on which the engine 9 is mounted and roll on arc-shaped members 32 arranged concentrically with the edges 24 and 25. These rollers help to support the portion 7 of the car platform.

I desire it to be understood that my invention is not limited to the particular construction shown and described, and I aim in the appended claims to cover all modifications which do not depart from the spirit and scope of my invention.

What I claim as new and desire to secure by Letters Patent of the United States, is,—

1. In a motor car, an engine developing power for driving said car, a car platform comprising a main portion and a portion on which said engine is mounted, a car truck on which said main portion of the car platform is pivotally mounted, and means for supporting said portion of the car platform on which said engine is mounted separately from said main portion of the car platform so that the vibrations of the engine are not transmitted to said main portion of the car platform.

2. In a motor car, an engine developing power for driving said car, a car platform comprising a main portion and a portion on which said engine is mounted, means for pivotally mounting said main portion of the car platform, and means for supporting said portion of the car platform on which said engine is mounted separately from said main portion of the car platform so that the vibrations of the engine are not transmitted to said main portion of the car platform.

3. In a motor car, an engine developing power for driving said car, a car platform comprising a main portion and a portion on which said engine is mounted, a car truck, means for pivotally mounting said main portion of the car platform on said truck, and means for elastically supporting said portion of the car platform on which said engine is mounted separately from said main portion of the car platform, so that the vibrations of the engine are not transmitted to the main portion of the car platform.

4. In a motor car, an engine developing power for driving said car, a car platform comprising a main portion and a portion on which said engine is mounted, car axles, a car truck elastically supported on said car axles, means for pivotally mounting said main portion of the car platform on said car truck, and means for supporting said portion of the car platform on which said engine is mounted on said car axles independently of said car truck.

5. In a motor car, an engine developing power for driving said car, a car platform comprising a main portion and a portion on which said engine is mounted, car axles, a car truck elastically supported on said car axles, means for pivotally mounting said main portion of the car platform on said car truck, a spring support on said axles for said portion of the car platform on which said engine is mounted independent of said car truck.

6. In a motor car, an engine developing power for driving said car, a car platform comprising a main portion and a portion on which said engine is mounted, car axles, a car truck elastically supported on said car axles, means for pivotally mounting said main portion of the car platform on said car truck, and means for elastically supporting said portion of the car platform on which said engine is mounted so that the vibrations of the engine are not transmitted to the main portion of the car platform.

In witness whereof, I have hereunto set my hand this 10th day of May, 1912.

ERICH GRINDEL.

Witnesses:
WILHELM STRUSS,
FREDERICH HOYERMBUER.